United States Patent [19]

Abramson et al.

[11] Patent Number: 5,778,220

[45] Date of Patent: Jul. 7, 1998

[54] METHOD AND APPARATUS FOR DISABLING INTERRUPTS IN A HIGHLY PIPELINED PROCESSOR

[75] Inventors: Jeffrey M. Abramson, Aloha; Kris G. Konigsfeld; Rohit A. Vidwans, both of Portland, all of Oreg.

[73] Assignee: Intel Corporation, Santa Clara, Calif.

[21] Appl. No.: 749,896

[22] Filed: Nov. 18, 1996

[51] Int. Cl.$^6$ ............................................. G06F 9/22
[52] U.S. Cl. ..................................... 395/591; 395/734
[58] Field of Search ................................. 395/591, 734

[56] References Cited

U.S. PATENT DOCUMENTS

| | | | |
|---|---|---|---|
| 5,504,925 | 4/1996 | Jeffs | 395/591 |
| 5,664,137 | 9/1997 | Abramson et al. | 395/392 |

OTHER PUBLICATIONS

Torng et al.; Interrupt Handling for Out-of-Order Execution Processors; IEEE Transactions on Computers, vol. 42, No. 1; pp. 122–127, Jan. 1993.

Wang et al.; Implementing Precise Interruptions in Pipelined RISC Processors; IEEE Micro; pp. 36–43, Aug. 1993.

*Primary Examiner*—William M. Treat
*Assistant Examiner*—Kenneth R. Coulter
*Attorney, Agent, or Firm*—Blakely, Sokoloff, Taylor & Zafman

[57] ABSTRACT

A method and apparatus disables and re-enables an interrupt during the execution of certain I/O and memory operations in an out-of-order processor. The out-of-order processor executes macroinstructions, wherein each macroinstruction comprises one or more microinstructions. The out-of-order processor comprises a fetch and issue unit and a reorder buffer that allows an interrupt to be serviced during the execution of the microinstructions making up any of a first class of macroinstructions. The reorder buffer, however, does not allow the interrupt to be serviced during execution of microinstructions making up a second class of macroinstructions. The second class of macroinstructions may include I/O and memory operations.

16 Claims, 13 Drawing Sheets

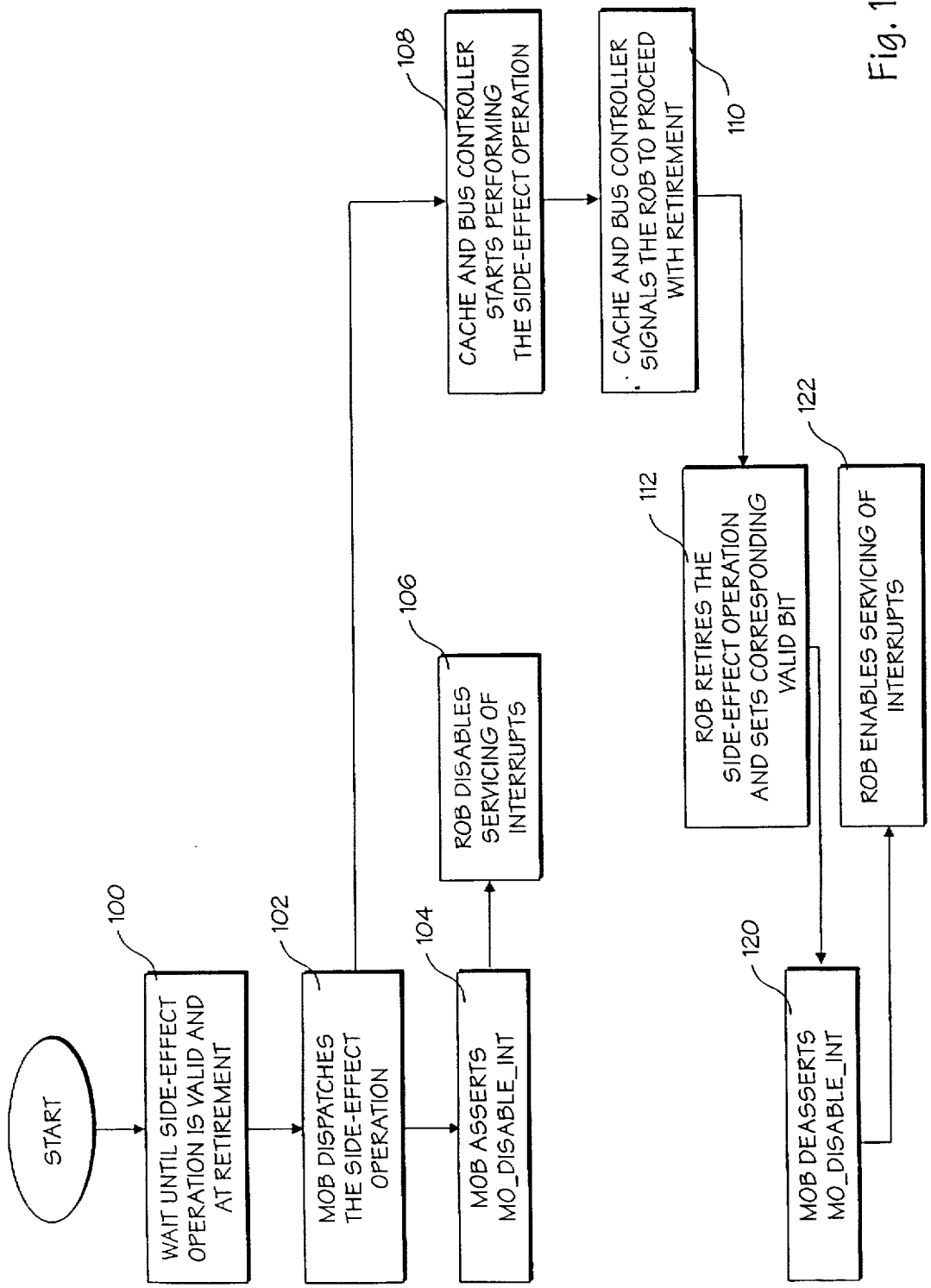

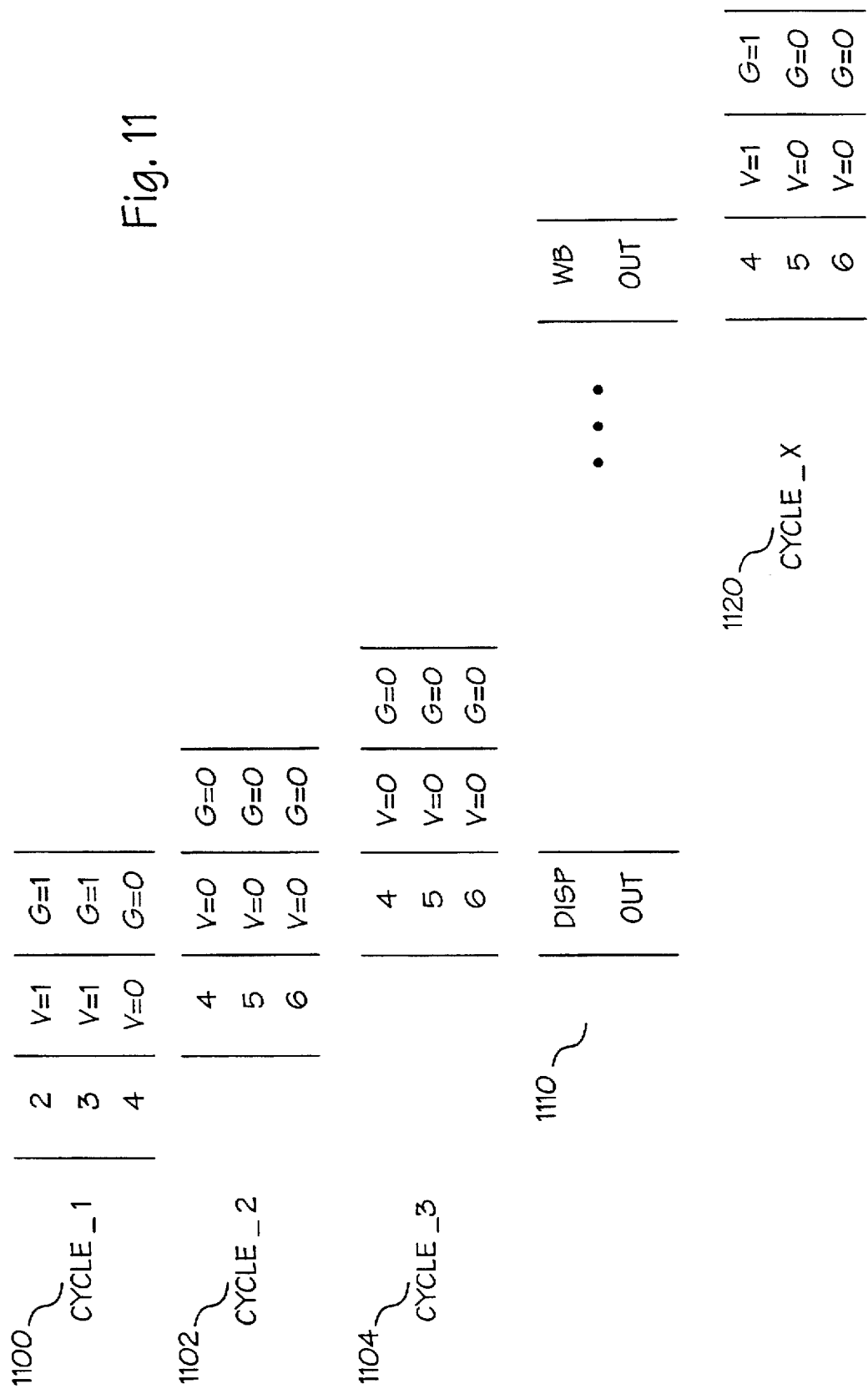

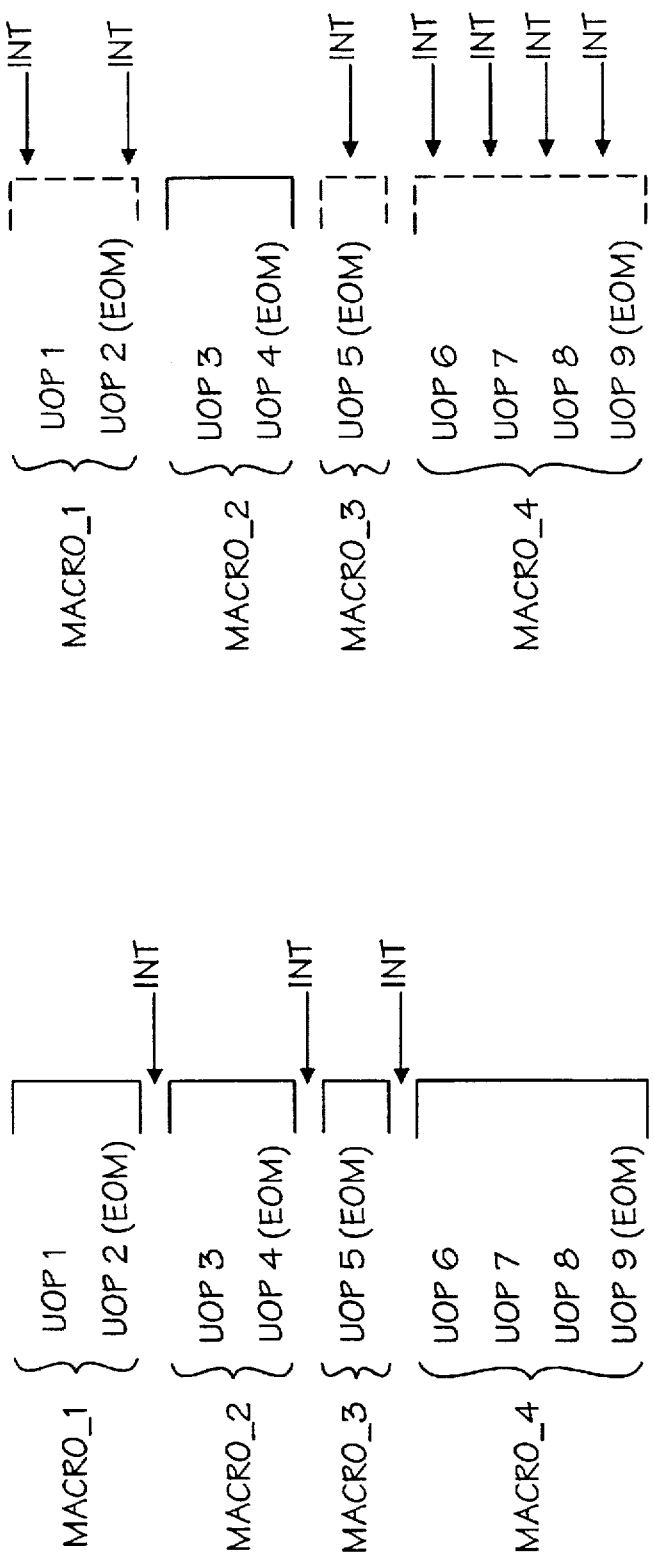

METHOD AND APPARATUS FOR DISABLING INTERRUPTS IN A HIGHLY PIPELINED PROCESSOR

FIELD OF THE INVENTON

The present invention relates to the field of computer systems; more particularly, the present invention relates to the disabling and re-enabling of interrupts in an out-of-order processor while performing selected operations.

BACKGROUND OF THE INVENTION

A computer system may be divided into three basic blocks: a central processing unit (CPU), memory, and input/output (I/O) units. These blocks are coupled to each other by a bus. An input device, such as a keyboard, mouse, stylus, analog-to-digital converter, etc., is used to input instructions and data into the computer system via an I/O unit. These instructions and data can be stored in memory. The CPU receives the data stored in the memory and processes the data as directed by a set of instructions. The results can be stored back into memory or outputted via the I/O unit to an output device, such as a printer, cathode-ray tube (CRT) display, digital-to-analog converter, etc.

The CPU receives data from memory as a result of performing load operations. Each load operation is typically initiated in response to a load instruction. The load instruction specifies an address to the location in memory at which the desired data is stored. The load instruction also usually specifies the amount of data that is desired. Using the address and the amount of data specified, the memory may be accessed and the desired data obtained.

The CPU also provides data to memory as a result of performing store operations. Each store operation is typically initiated in response to a store instruction. The store instruction specifies an address to the location in memory at which the desired data is to be provided for storage. The store instruction also usually specifies the amount of data that is provided. Using the address and the amount of data specified, the memory may be accessed for the storage of the data.

Similarly, the CPU receives data from the I/O devices as a result of performing an IN operation, and the CPU provides data to the I/O devices as a result of performing an OUT operation. Typically, IN and OUT operations can take many clock cycles to complete.

Some computer systems have the capability to execute instructions out-of-order. In other words, the CPU in the computer system is capable of executing one instruction before a previously issued instruction. This out-of-order execution is permitted because there was no dependency between the two instructions. That is, the subsequently issued instruction does not rely on a previously issued unexecuted instruction for its resulting data or its implemented result. The CPU may also be capable of executing instructions speculatively, wherein conditional branch instructions may cause certain instructions to be fetched and issued based on a prediction of the condition. Therefore, depending on whether the CPU predicted correctly, the CPU will be either executing the correct instructions or not. Branch prediction and its relationship with speculative execution of instructions is well-known in the art. For a detailed explanation of speculative out-of-order execution, see M. Johnson, *Superscalor Microprocessor Design*, Prentice Hall, 1991. Speculative and out-of-order execution offer advantages over the prior art, including better use of resources. If multiple instructions are permitted to be executed at the same time, this performance benefit greatly increases.

Additionally, pipelining is used to speed up the execution of the processor. By employing pipelining, while one instruction is executing, one or more other instructions are initiated such that multiple instructions are processed concurrently. For example, if each instruction takes three cycles to complete. A first instruction may be started in the first cycle. A second instruction may be started in the second cycle, and a third instruction may be started in the third cycle, and so forth. Barring any irregularities, the first instruction will finish in the third cycle. The second instruction will finish in the fourth cycle, and the third instruction will finish in the fifth cycle. Pipelining affords much more efficient usage of the processor than if the instructions were performed serially.

Certain types of memory operations, such as uncacheable memory operations, can be destructive when executed. These loads and stores are known as side-effect loads and stores. They also include loads and stores to memory locations mapped to I/O devices. Once a side-effect load or store is performed, the effects are often not correctable. For this reason, side-effect loads and stores cannot be performed speculatively. For example, if a side-effect load is performed to the memory subsystem, this could cause the data stored in the memory subsystem at the indicated address to change values. The side-effect load could also cause other non-recoverable side effects including changing other memory locations or changing page tables.

Similarly, IN and OUT operations (I/O operations) may also cause side effects; once they are performed, the effects are often not correctable.

Problems may occur if an interrupt occurs during execution of a side-effect operation, defined as a side-effect load or store or an I/O operation.

SUMMARY OF THE INVENTION

A method and apparatus for disabling and re-enabling an interrupt during the execution of certain operations in an out-of-order processor are described. The out-of-order processor executes macroinstructions, wherein each macroinstruction comprises one or more microinstructions. The out-of-order processor comprises a fetch and issue unit and a reorder buffer that allows an interrupt to be serviced during the execution of the microinstructions making up any of a first class of macroinstructions. The reorder buffer, however, does not allow the interrupt to be serviced during execution of microinstructions making up a second class of macroinstructions.

BRIEF DESCRIPTION OF THE DRAWINGS

The present invention will be understood more fully from the detailed description given below and from the accompanying drawings of the preferred embodiments of the invention, which, however, should not be taken to limit the invention to the specific embodiments, but are for explanation and understanding only.

FIG. 1 is a flow diagram illustrating the steps taken in the present invention.

FIG. 11 is a timing diagram of the retirement process of operations in the ROB.

FIGS. 12 and 13 show a sequence of macroinstructions. FIG. 12 shows a sequences of macroinstructions in a prior art system. FIG. 13 shows a sequences of macroinstructions utilizing the present invention.

DETAILED DESCRIPTION OF THE PRESENT INVENTION

Overview of the Present Invention

Figure 2A:
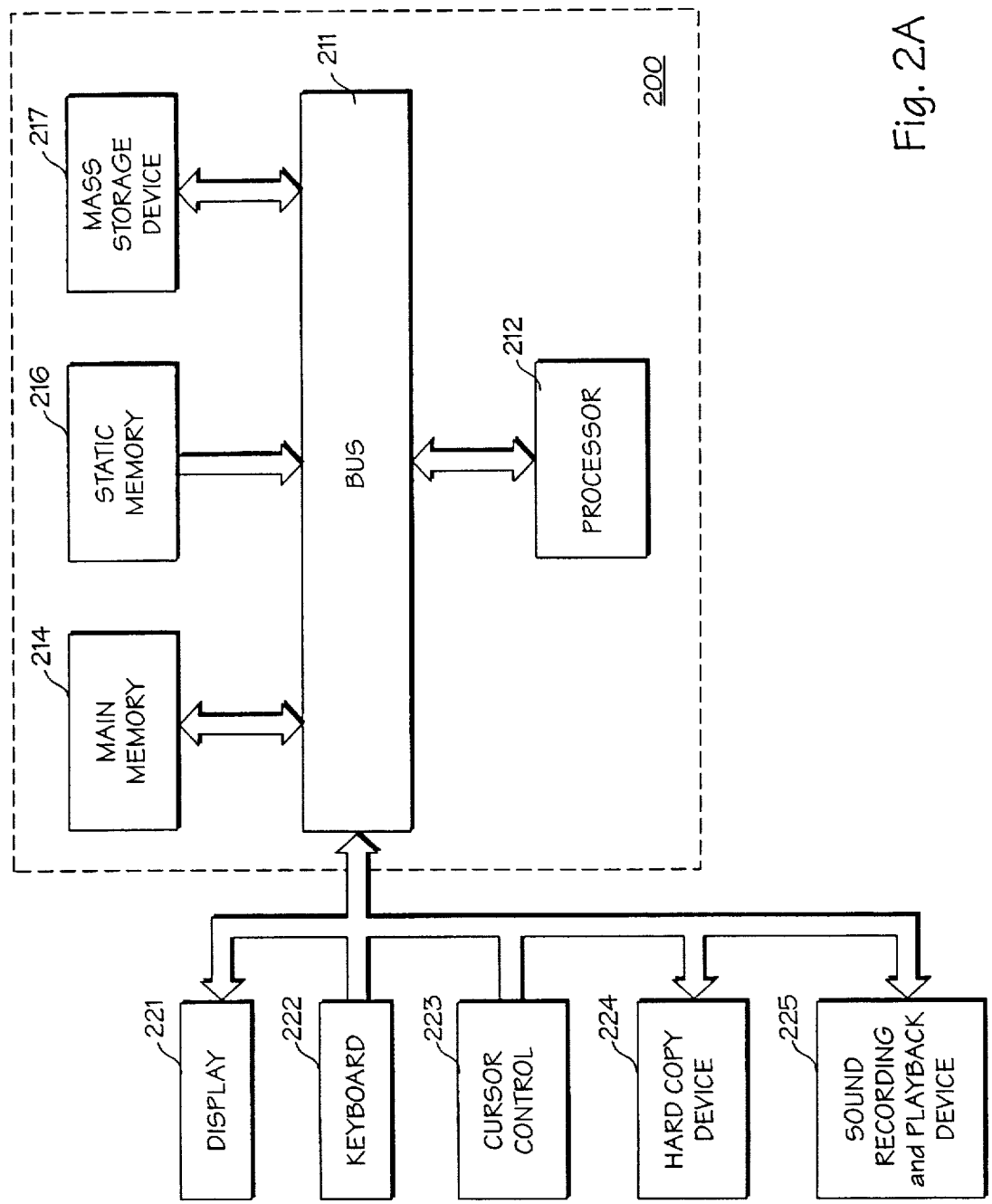
FIG. 2A is a block diagram of the computer system of the present invention.

The present invention includes a process and mechanism for executing I/O operations in an out-of-order processor. The present invention performs the I/O operations in response to IN instructions and OUT instructions executed in a computer system. An I/O operation cannot be interrupted, as it may have harmful side effects. Similarly, side-effect loads and stores to memory, such as uncacheable loads and stores to memory cannot be interrupted. Once a side-effect operation, defined as an I/O operation or side-effect memory operation, is dispatched, it must be allowed to complete: by completing successfully or by returning an error indication.

FIG. 1 illustrates a flow diagram of the present invention. The flow diagram begins at a block 100 in which a side-effect operation is valid and at retirement, as will be described later. Retirement is when all previous operations have already been executed and committed to processor state. A memory order buffer (MOB) dispatches the side-effect operation at block 102 by signaling a cache and bus controller to perform the I/O operation. At block 104, the MOB turns on a signal (MO_DISABLE_INT) that tells a Reorder Buffer (ROB) not to service any incoming interrupts. The ROB responds by disabling the servicing of interrupts, as shown in block 106. In one embodiment, the MO_DISABLE_INT signal is ORed with other interrupt disable signals to provide a cumulative interrupt disable signal within the ROB, as will be shown with respect to FIG. 10.

At block 108, the cache and bus controller has started performing the side-effect operation. When the side-effect operation completes, the cache and bus controller signals the ROB to proceed with retiring the operation, as shown at block 110. For one embodiment, the cache and bus controller comprises circuitry for controlling cache cycles and/or external bus cycles. For an alternative embodiment, the cache and bus controller is replaced by a bus controller that controls external bus cycles but not cache cycles.

At block 112, the ROB proceeds with retiring the side-effect operation. The ROB updates the register state of the processor. The ROB also sets a valid bit indicating that it is retiring the current operation that it is processing. The MOB notices when the ROB retires an operation, and turns off the MO_DISABLE_INT signal, as shown at block 120.

The flow diagram ends at block 122, at which the ROB enables servicing of interrupts responsive to the disabling of the MO_DISABLE_INT signal.

Overview of the Computer System of the Present Invention

Referring to FIG. 2A, the computer system upon which a preferred embodiment of the present invention is implemented is shown as 200. Computer system 200 comprises a bus or other communication means 211 for communicating information, and a processing means 212 coupled with bus 211 for processing information. Processor 212 includes, but is not limited to microprocessors such as an Intel Architecture Microprocessor, manufactured by Intel Corporation of Santa Clara, Calif., the corporate assignee of the present invention. Processor 212 may also be another microprocessor such as the PowerPC™, Alpha™, etc. System 200 further comprises a random access memory (RAM) or other dynamic storage device 214 (referred to as main memory), coupled to bus 211 for storing information and instructions to be executed by processor 212. Main memory 214 also may be used for storing temporary variables or other intermediate information during execution of instructions by processor 212. Computer system 200 also comprises a read only memory (ROM) and/or other static storage device 216 coupled to bus 211 for storing static information and instructions for processor 212, and a data storage device 217 such as a magnetic disk or optical disk and its corresponding disk drive. Data storage device 217 is coupled to bus 211 for storing information and instructions.

Computer system 200 may further be coupled to a display device 221, such as a cathode ray tube (CRT) or liquid crystal display (LCD) coupled to bus 211 for displaying information to a computer user. An alphanumeric input device 222, including alphanumeric and other keys, may also be coupled to bus 211 for communicating information and command selections to processor 212. An additional user input device is cursor control 223, such as a mouse, a trackball, stylus, or cursor direction keys, coupled to bus 211 for communicating direction information and command selections to processor 212, and for controlling cursor movement on display 211. Another device which may be coupled to bus 211 is hard copy device 224 which may be used for printing instructions, data, or other information on a medium such as paper, film, or similar types of media. Furthermore, a sound recording and playback device, such as a speaker and microphone may optionally be coupled to bus 211 for interfacing with computer system 200. Note that any or all of the components of system 200 and associated hardware may be used in a preferred embodiment, however, it can be appreciated that any type of configuration of the system may be used for various purposes as the user requires.

Figure 2B:
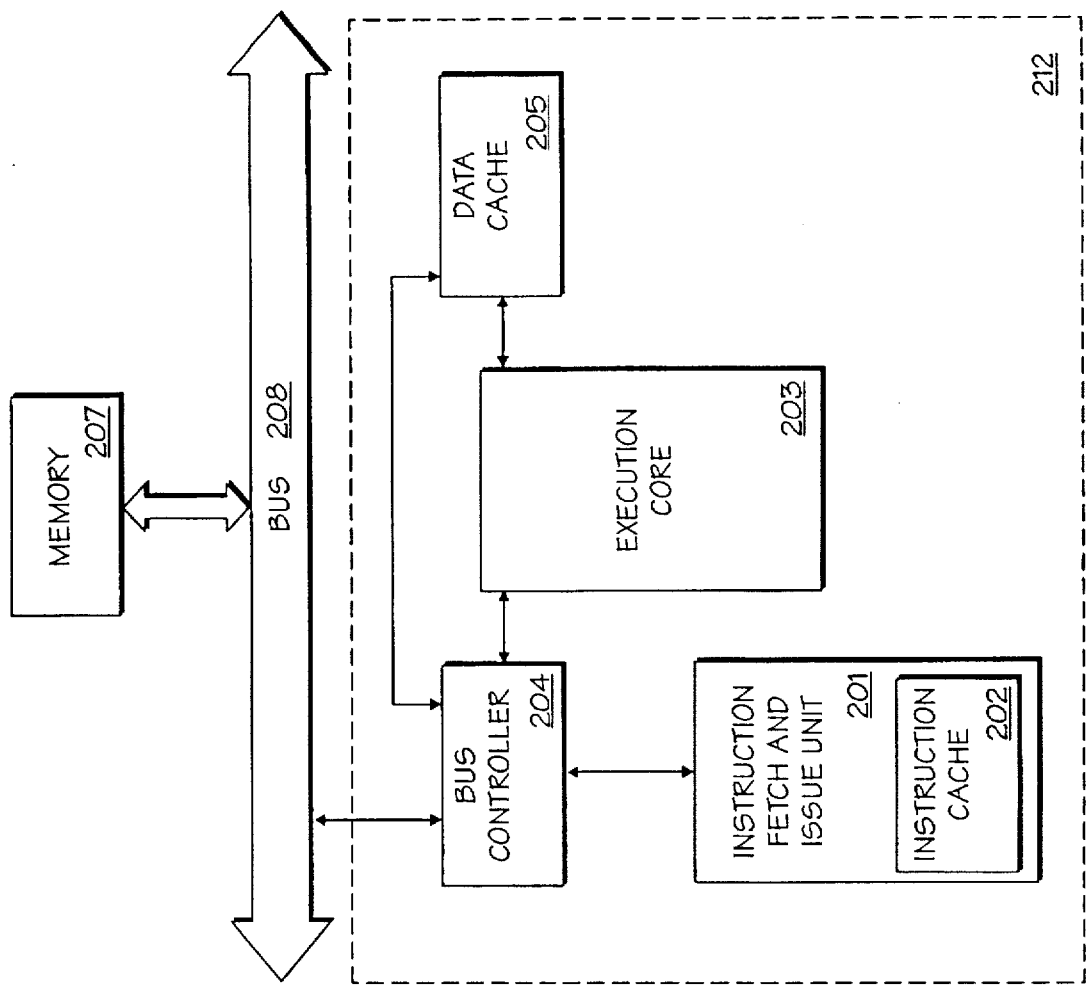
FIG. 2B is a block diagram of the memory subsystem of the present invention.

FIG. 2B is a block diagram of the memory subsystem of the computer system of the present invention. Referring to FIG. 2B, the memory subsystem comprises an instruction fetch and issue unit 201 with an integrated instruction cache 202, an execution core 203, a bus controller 204, a data cache memory 205, a memory unit 207, and a bus 208.

The memory unit 207 is coupled to the system bus. The bus controller 204 is coupled to the bus 208. The bus controller 204 is also coupled to the data cache memory 205 and the instruction fetch and issue unit 201. The instruction fetch and issue unit 201 is also coupled to the execution core 203. The execution core 203 is also coupled to the data cache memory 205. In the present invention, the instruction fetch and issue unit 201, the execution core 203, the bus controller 204, and the data cache memory 205 together comprise the processor 212 (FIG. 2A). In the present invention, elements 201–205 cooperate to fetch, issue, execute and save the execution results of instructions in a pipelined manner.

The instruction fetch and issue unit 201 fetches instructions from an external memory, such as memory unit 207, through the bus controller 204 via bus 208, or any other external bus. The fetched instructions are stored in instruction cache 202. The bus controller 204 manages transfers of data between external components and the processor 102. In addition, it manages cache coherency transfers. The instruction fetch and issue unit 201 issues these instructions in order to the execution core 203. The execution core 203 performs arithmetic and logic operations, such functions as add, subtract, logical AND, and integer multiply, as well as memory operations. Some instructions are fetched and issued speculatively.

The execution core 203 includes an execution unit that holds and executes the integer and floating point instructions when their operand dependencies on execution results of preceding instructions are resolved, including those integer and floating point instructions that are speculatively fetched and issued. Similarly, the execution core 203 also includes a memory execution unit that holds, executes and dispatches load and store instructions to the data cache memory 205 (as well as external memory) as soon as their operand dependencies on execution results of preceding instructions are resolved, including those load and store instructions that are speculatively fetched and issued.

The data cache memory 205 responds to the load instructions immediately, forwarding data if necessary, whereas the store instructions are buffered. In other words, the instructions are not necessarily executed/forward in the order they were issued, and some instructions are speculatively executed/forwarded. However, the execution results of the integer, floating point and load instructions are buffered, and then committed to processor state in program order. The buffered store instructions are committed to processor state in program order and then executed in the "background", at the convenience of the memory system. Speculative integer, floating point and load execution results and buffer stores of mispredicted branches are purged. Note that the speculative nature of fetched, issued and executed instructions is attributed to the uncertainty of whether a particular instruction or set of instructions is to be executed due to an unaffirmed branch prediction.

Instruction fetch and issue unit 201 is intended to represent a broad category of instruction fetching and issuing elements found in many computer systems. Their constitutions and functions are well-known and will be described only as necessary with reference to later figures.

The bus controller 204, the bus 208, and the memory 207 are also intended to represent a broad category of these elements found in most computer systems. Their functions and constitutions are well-known and will not be described further. The execution core 203, incorporating with the teachings of the present invention, and the data cache memory 205 will be described further in detail below with additional references to the remaining figures.

Figure 3:
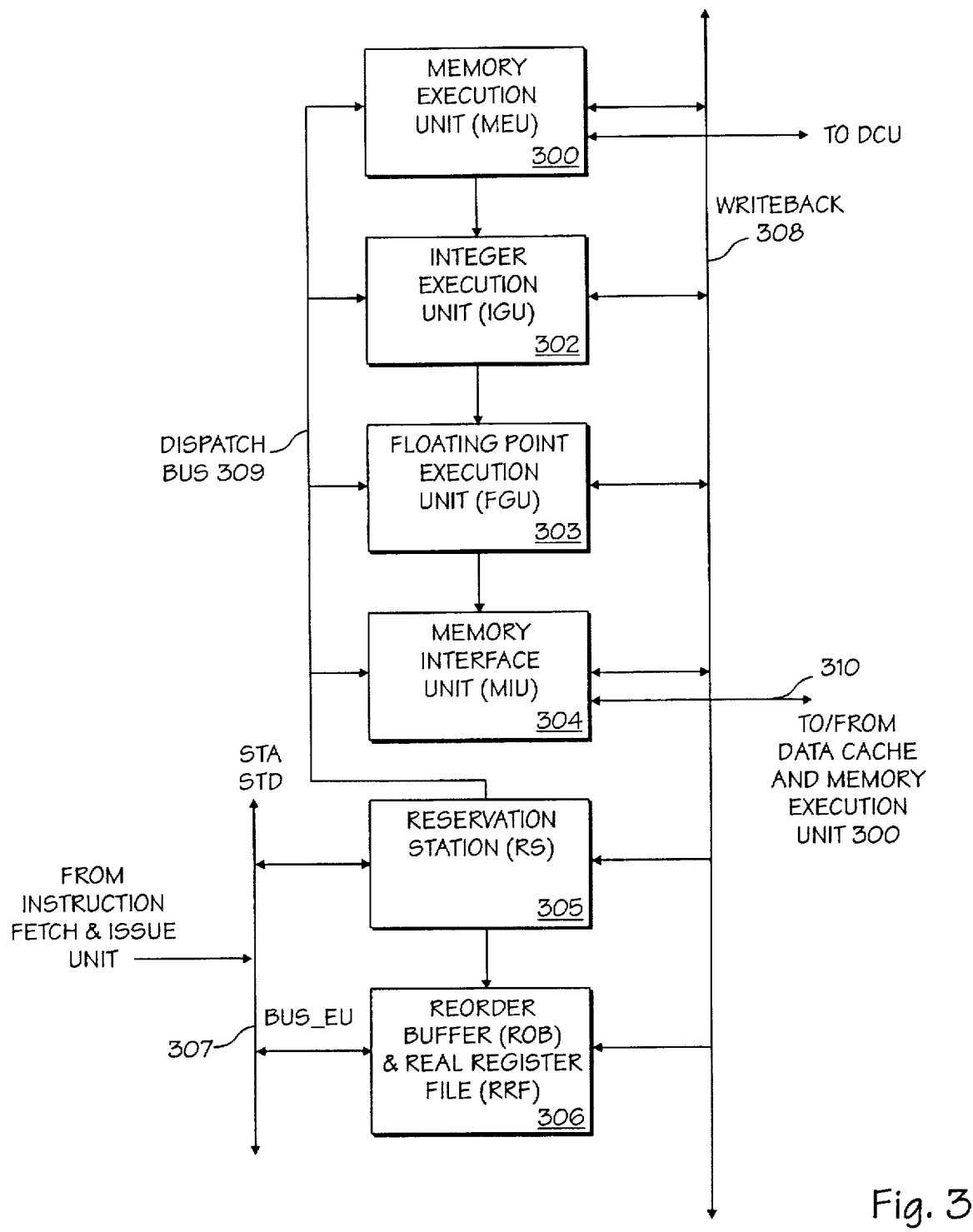
FIG. 3 is a block diagram of one embodiment of the execution unit of the present invention.

FIG. 3 is a block diagram of one embodiment of the execution core of the present invention. Referring to FIG. 3, execution core 203 comprises a reservation station (RS) 305, a memory execution unit MEU 300, an integer execution unit (IEU) 302, a floating point execution unit (FEU) 303, a memory interface unit (MIU) 304, a reorder buffer (ROB) and real register file (RRF) 306. Additionally, execution core 203 includes an internal bus (Bus_EU) 307 and a writeback bus 308. MEU 300, an address generation unit (AGU) 301 (shown in FIG. 5), IEU 302, FEU 303 and MIU 304 are all coupled to reservation station 305 via a dispatch bus 309. They are also coupled to writeback bus 308. MIU 304 is also coupled to the data cache memory and MEU 300 via bus 310. RS 305 is coupled to the writeback bus 308 and the Bus_EU 307. RS 305 is also coupled to ROB and RRF 306. ROB and RRF 306 is also coupled to the Bus_EU 307 and the writeback bus 308. Together, elements 300–310 are coupled to hold, dispatch, execute and commit execution results of instructions, whereas described earlier, the dispatching and execution of instructions are not necessarily in the order the instructions are issued. That is, the instructions could be dispatched and executed out-of-order. Execution core 203 may include multiple IEUs, such as two, and multiple FEUs, such as two.

Reservation station 305 receives and stores the issued instructions resolving their operands with data from the IEU 302, the FEU 303, the data cache memory, the ROB and RRF 306 and holds them until their operands are all resolved. The RS 305 then dispatches the issued instructions to the AGU 301, the IEU 302, the FEU 303 and the MIU 304 and the MEU 300 as appropriate.

In particular, the load instruction is dispatched as a single operation, whereas the store instruction is dispatched as store address (STA) and store data (STD) operations to the MEU 300 and MIU 304. Similar to instruction fetching, there is no requirement that the load sources or the store destinations be aligned to memory locations. In other words, the load sources of load instructions and store destinations of store instructions may span two cache lines (or two pages).

The MEU 300, the IEU 302, FEU 303, and the MIU 304 in turn perform their operations accordingly. The execution results of the integer, floating point and load instructions are held in the ROB 306, and then committed by RRF 306 in the order these instructions were issued. Speculative execution results of the mispredicted branches are not committed, but instead are held in the ROB 306 and purged upon their detections.

Figure 5:
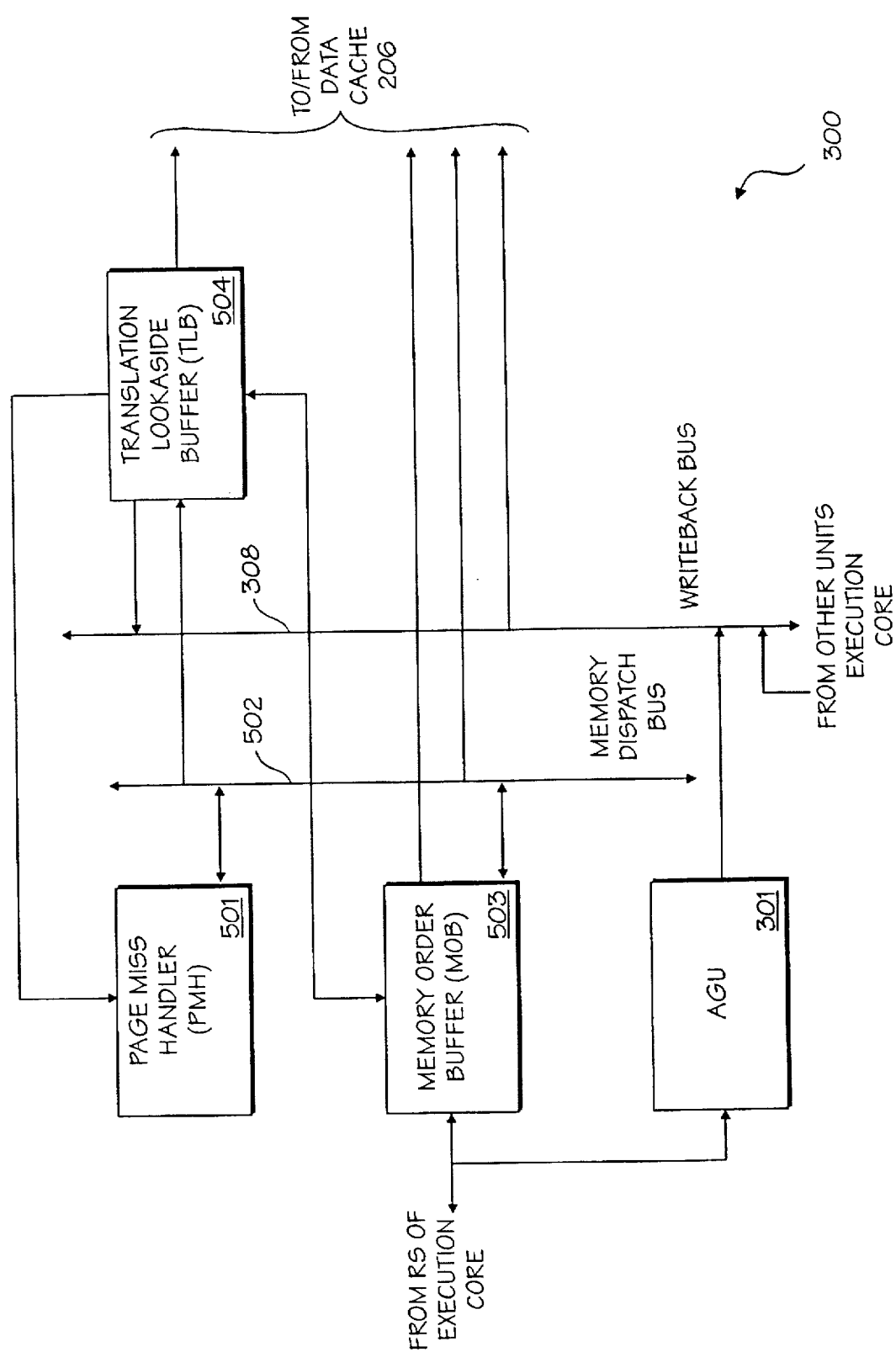
FIG. 5 is a block diagram of the relevant portions of the cache controller of the present invention.

FIG. 5 depicts a block diagram of the relevant portions of one embodiment of the memory execution unit (MEU) of the present invention. Referring to FIG. 5, the MEU 205 includes AGU 301, page miss handler (PMH) 501, memory order buffer (MOB) 503, and translation lookaside buffer (TLB) 504, as well as memory dispatch bus 502 and the writeback bus 308. PMH 501 is coupled to the memory dispatch bus 502, writeback bus 308, and TLB 504. MOB 503 is coupled to the reservation station, memory dispatch bus 502, writeback bus 308, the data cache memory 205 and TLB 504. TLB 504 is also coupled to memory dispatch bus 502, writeback bus 308 and the data cache memory 205. Memory dispatch bus 502 and writeback bus 308 are also coupled to the data cache memory. AGU 301 is coupled to MOB 503, the writeback bus 308, and the dispatch bus 309.

The AGU 301, MOB 503, PMH 501, and TLB 504 control all load accesses to the data cache memory and, in turn, the memory of the computer system. The AGU 301, MOB 503, PMH 501, and TLB 504 also execute the STA portion of the store. Specifically, MOB 503 buffers the results of the STA execution for the eventual store dispatch to the data cache memory.

The AGU 301 generates the appropriate linear address for the memory operations. The AGU 301 computes the linear address using a base address, a displacement value, a scale value, an index value and a segment value. In one embodiment, the linear address is 32-bits long with the twenty higher order bits identifying a memory page and the twelve low order bits identifying the off-set within the memory page. An example of such an addressing scheme is shown in FIG. 4.

Figure 4:
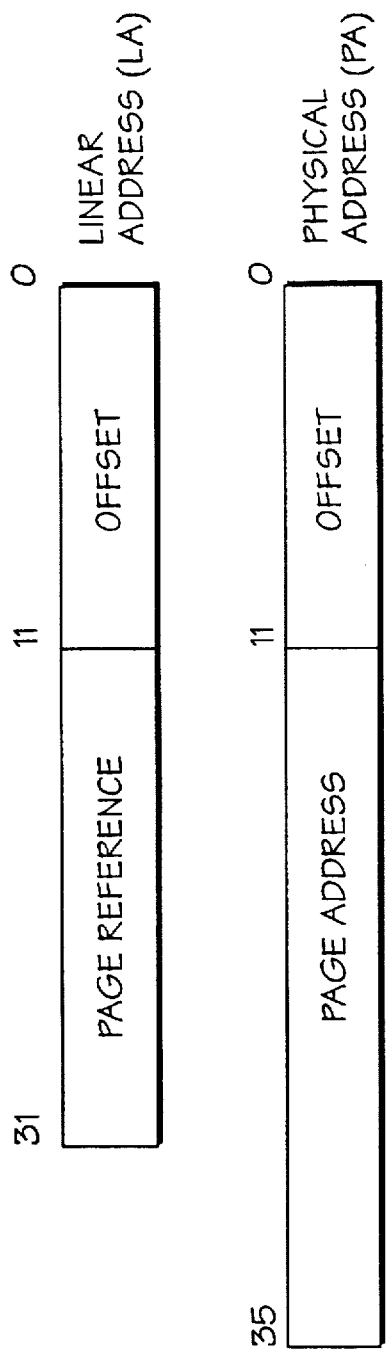
FIG. 4 illustrates an example of one embodiment of the addressing scheme of the present invention.

TLB 504 translates the 32-bit linear address into a 36-bit physical address with 24 higher order bits indicating the memory page, as shown in FIG. 4, and forwards misses to PMH 501. In response, PMH 501 performs page walking and other well-known page miss handling functions. The MOB 503, incorporated with the teachings of the present invention, controls dispatching, buffers all store and load operations, tracks their progress as they move through execution, and then retires/commits them to permanent architectural state as appropriate. MOB 503 then causes the retired/committed stores to be executed in due course "background" at the convenience of the memory system.

Additionally, MOB 503 responds to load operations by forwarding buffered data as necessary. When an operation is dispatched and cannot complete due to some address or resource conflict, MOB 503 blocks the operation and stores the dependency information. MOB 503 redispatches blocked operations when the blocking source is removed. Some memory operations cannot execute speculatively. MOB 503 controls the necessary monitoring and dispatches these non-speculative operations at the correct time. For instance, MOB 503 snoops the source addresses of instructions fetched and generates a single stall signal for the bus controller to stall an instruction fetch whenever the source address instruction being fetched substantially matches any of the addresses of the store destinations of the buffered stored instructions.

The TLB 504 and the PMH 501 are intended to represent a broad category of these elements found in most computer systems. MOB 503 will be described in further detail below with additional references to the remaining figures.

Figure 6:
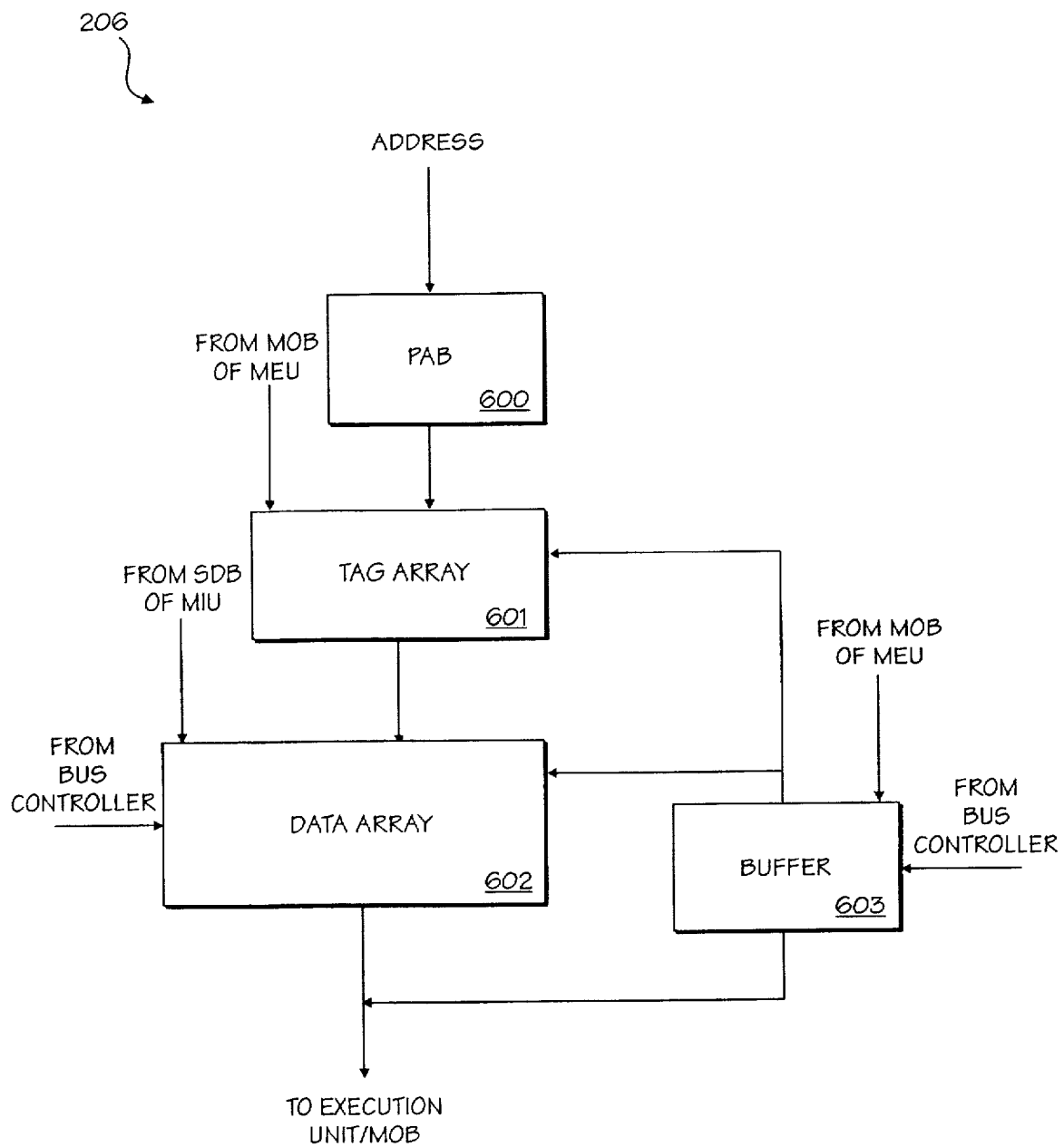
FIG. 6 is a block diagram of the relevant portions of the data cache of the present invention.

FIG. 6 is a block diagram of one embodiment of the data cache memory of the present invention. Referring to FIG. 6, the data cache memory 205 comprises a physical address buffer (PAB) 600, data tag array 601 and a data array 602 and queue 603. PAB 600 is coupled to receive an input (e.g., the physical address) from the TLB of the MEU and is coupled to produce a physical address to tag array 601. Tag array 601 is coupled to receive an input (e.g., either store address or load address) from the MOB of the MEU. Data array 602 is coupled to receive an input from tag array 601 and the store data buffer (SDB) of the MEU, as well as being coupled to the bus controller. In response, data array 602 produces an output to the execution core. Queue 603 is also coupled to tag array 601 and data array 602. Queue 603 is also coupled to receive an input from the MOB as well as the bus controller.

The PAB 600 receives and saves the 24 high order bits of the translated physical addresses from the TLB of the MEU for the store and load operations, and in cooperation with the MOB and MIU, commits them to processor state and executes them as appropriate. Data tag array 601 stores the physical address tags of the data currently being cached in data array 602 and tag matches the accessing physical addresses against the stored physical address tags. Data array 602 receives and stores the data currently being cached and responds to data loads. In one embodiment, data tag array 601 and data array 602 have sufficient capacity for storing 128 sets of 2-way set associative 32-byte cache lines of data and their corresponding address tags. PAB 600, in cooperation with the MOB of the data cache controller, will be discussed in further detail below. TAG array 601 and data array 602 are intended to represent a broad category of these elements found in most computer systems, whose functions and constitutions are well-known and will not be further described.

Queue 603 contains accesses to data cache memory 205 that miss the cache memory and are currently pending on the bus. The entries in queue 603 are also checked where the data cache memory is accessed to determine if the desired data is stored in one of its entries or there is a request for that cache line currently pending on the bus. Queue 603 includes storage locations for temporarily storing the data returned for those pending operations. Queue 603 supplies the data and its tag information to data array 602 and tag array 601 respectively. In one embodiment, the queue 603 includes four entries having a 256 bit width (one cache line).

Figure 7:
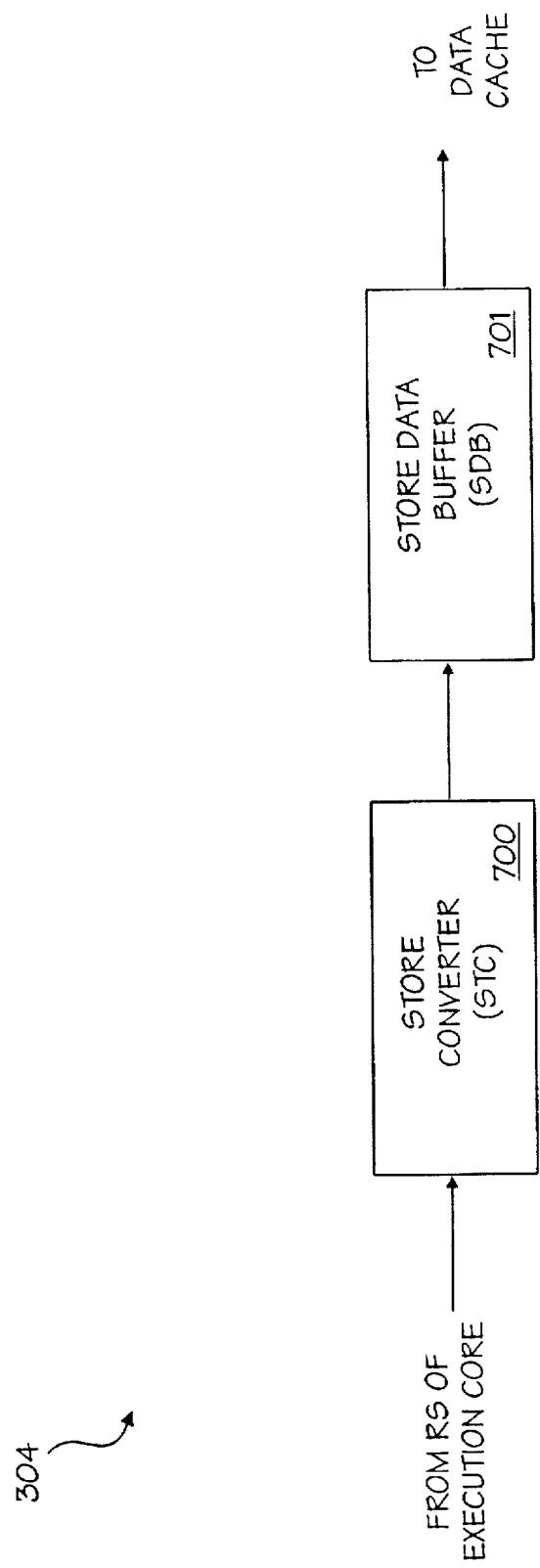
FIG. 7 is a block diagram of the relevant portions of memory interface unit of the present invention.

FIG. 7 is a block diagram of one embodiment of the relevant portions of the MIU of the execution unit of the present invention. Referring to FIG. 7, the MIU 304 comprises a store converter (STC) 700 and a store data buffer (SDB) 701, coupled to each other, such that store converter 700 receives data from the reservation station of the execution unit and sends data to SDB 701. SDB 701 then sends the data onto the data cache memory.

The STC 700 converts the floating point data of the STD operations. The SDB 701 receives and stores the STD operations and in cooperation with the store address buffer (SAB) of the data cache controller, and the PAB of the data cache, retires/commits the STD operations as appropriate, and causes them to be executed. The functions and constitutions of the STC 700 are well-known and will not be further described. SDB 701 and its cooperation with the SAB and PAB, will be described in further detail below.

Figure 8:
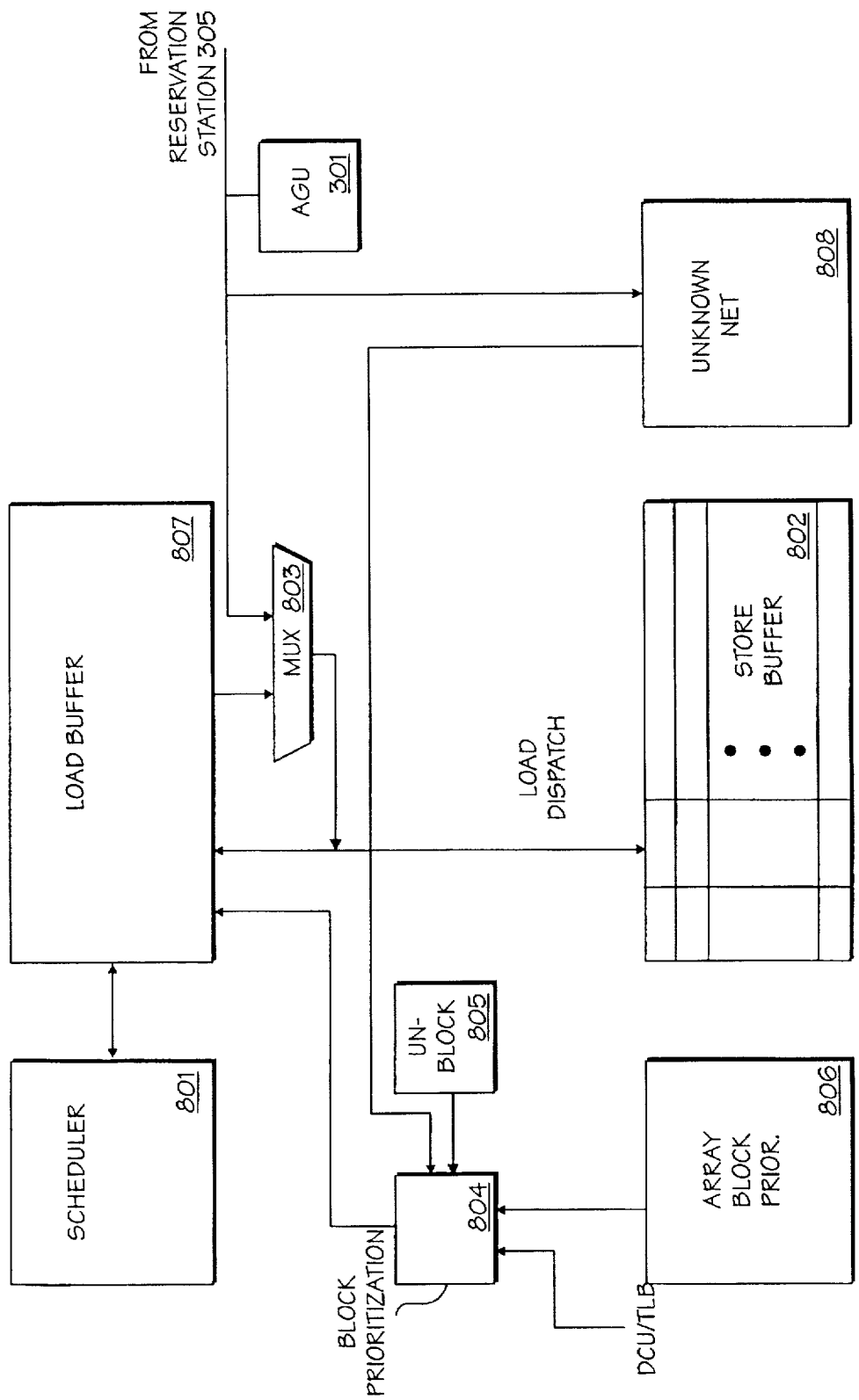
FIG. 8 is a block diagram of the relevant portions of the memory order system of the present invention.

FIG. 8 is a block diagram of one embodiment of the relevant portions of the memory order buffer (MOB). Referring to FIG. 8, the MOB comprises scheduler 801, load buffer (LB) 807, multiplexer (MUX) 803, block prioritization logic 804, unconditional block 805, array block prioritization 806, store buffer 802, and unknown net block 808. Scheduler 801 is coupled to load buffer 807. Load buffer 807 is coupled to block prioritization 804, store buffer 802 and MUX 803. Block prioritization logic 804 is also coupled to receive an input from the TLB and the data cache memory, unknown net 808, array block prioritization 806 and unconditional block 805. Unknown net 808 and MUX 803 are also coupled to the reservation station via the dispatch bus.

The SAB 802 stores the remaining operands and partial replications of the page denoting portions of the store destination addresses of buffered STA operations. The SAB 802, in cooperation with the SDB of the MIU and the PAB of the data cache memory, retires/commits the STA operations as appropriate, and causes them to be dispatched.

LB 807 also is coupled to receive a copy of the load operations dispatched from the RS via MUX 803. Load operations are copied into LB 807. LB 807 provides the stored load operations to the TLB and the execution pipe upon dispatch. MUX 803 receives loads from load buffer 807 and from the dispatch bus and outputs one for dispatch to memory.

Unknown net 808, unconditional block 805 and array block prioritization 806 determine if a specific set of condition exist that would cause or require a particular load operation to be prevented from executing. Each of these will be described below later. Block prioritization logic 804 receives conflicts/conditions/identification signals to block load and initiate operations stored in LB 807. Block prioritization logic indicates the status of load operations through signals sent to LB 807. Scheduler 801 schedules load operations for dispatch to memory based on their status.

Figure 9:
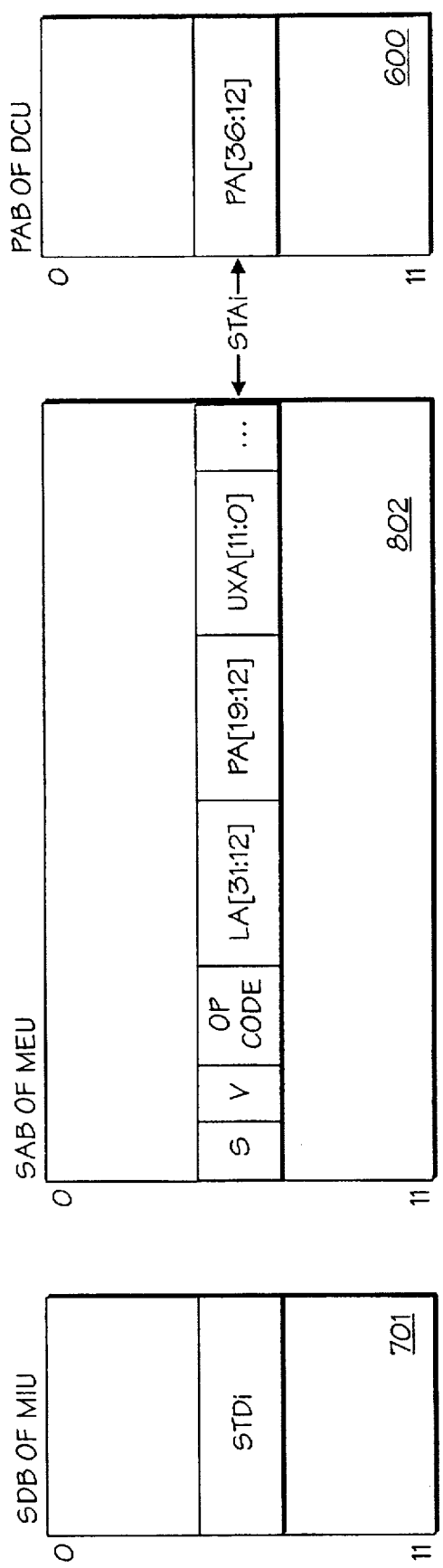
FIG. 9 is a block diagram depicting the interaction between the store address buffer the store data buffer and the physical address buffer.

FIG. 9 is a block diagram of one embodiment of the PAB, the SDB and the SAB. The PAB 600, the SDB 701 and SAB 802 all comprise an equal number of buffer slots. In one embodiment, up to a maximum of 12 buffer slots are included. The STD and STA operations of the store instructions are stored in corresponding buffer slots of the PAB 600, SDB 701 and SAB 802. More specifically, the 24 high order bits of the physical address (PA [36:12]) are stored in the buffer slot in the PAB 600. The STD operation is stored in a corresponding buffer slot in the SDB 701. The STA operation, including the valid bit, the OP code, the 20 high order bits of the linear address (LA [31:12]), and the 12 page offset designating bits of the address (UXA[11:0]), is stored in a corresponding buffer slot in the SAB 802. Additionally, the 8 lower order bits of a page designated portion of the physical address (PA[19:12]) of the STA operation are replicated in the buffer slot in the SAB 802. The STD and STA operations of most store operations are promoted to a "senior" state, i.e. ready for retirement or commitment, in due course, when their respective preceding instructions have been retired/committed or promoted to the "senior" state. The "senior" STD and STA operations are then executed in the "background" in due course when the data cache is free and then purged from the SDB 701, the SAB 802 and the PAB 600. The STD and STA operations of some of the store instructions, such as those storing data to memory locations mapped to I/O devices, are not eligible to be promoted to the "senior" state. The store data and store operations of these store instructions are retired/committed, and purged from the SDB 701, the SAB 802 and the PAB 600 concurrent with their executions. In other words, when the target I/O devices are ready to accept the data being "stored", then the execution occurs. In one embodiment, the linear addresses are driven from the SAB 802 to the TLB again, and the newly generated PA is directly provided to the tag array of the data cache, bypassing the PAB of the data cache memory. Additionally, if a store instruction involves storing data to memory locations spanning two cache lines, the data cache controller signals the data cache memory, and the STD and STA operations are driven to the data cache memory twice, with the data size and the physical address being adjusted accordingly the second time.

Performing Side-effect Operations

When the instruction fetch and issue unit receives a side-effect instruction such as an I/O instruction or an uncacheable load or store instruction, it decodes the instruction to perform a corresponding side-effect operation. The fetch and issue unit sends the decoded side-effect operation to the reservation station (RS) 305 for dispatch to the memory subsystem where any data dependencies between the side-effect operation and other operations are resolved.

The RS dispatches the side-effect operation to the MOB 503. The MOB prevents the side-effect operation from executing speculatively: the MOB stores the side-effect operation and will redispatch it when the side-effect operation is at retirement, i.e., when all previous in-order operations have already been executed and committed to the processor state.

Figure 10:
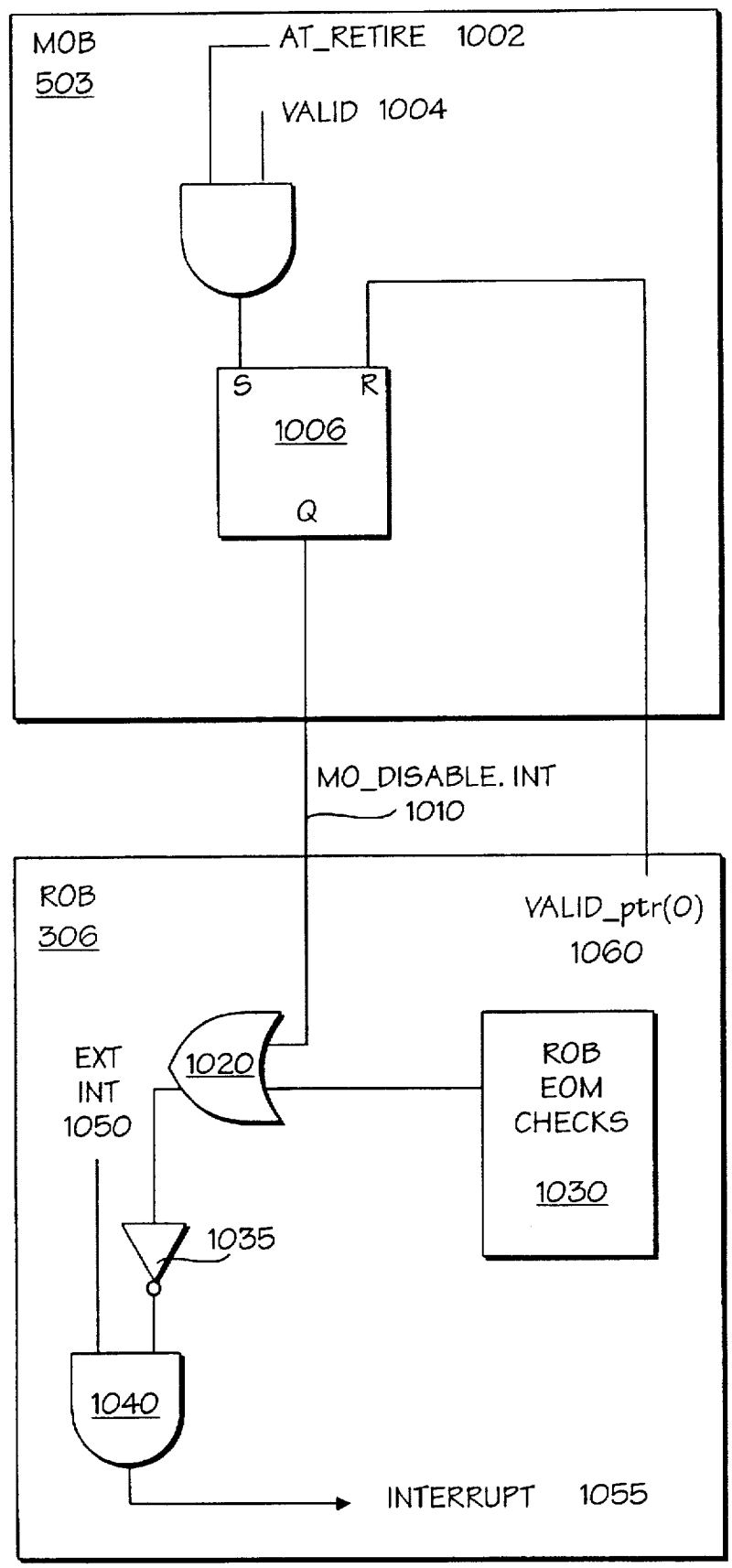
FIG. 10 is a block diagram showing the circuitry in the MOB and ROB for enabling and disabling interrupts during an I/O operation.

FIG. 10 is a block diagram showing one embodiment of circuitry in the MOB 503 and ROB 306 for enabling and disabling interrupts during a side-effect operation. When a side-effect operation that is currently dispatching is at retirement and is valid, as indicated by the signals 1002 and 1004, respectively, then a flip-flop 1006 produces a MO_DISABLE_INT signal 1010 to the ROB 306.

The MO_DISABLE_INT signal 1010 is an input to an OR gate 1020. OR gate 1020 also has an input from ROB End of Macro (EOM) check circuitry 1030. The OR gate 1020 provides an output to an inverter 1035, whose output is coupled to the input of an AND gate 1040. The AND gate 1040 receives a second input from an external interrupt signal 1050. The AND gate 1040 provides an INTERRUPT signal 1055 as an output which is routed to different parts of the processor for interrupt servicing. Thus, either the assertion of an input from the MO_DISABLE_INT signal 1010 or the ROB EOM check circuitry 1030 to the OR gate 1020 prevents the INTERRUPT signal 1055 from being asserted by the AND gate 1040. The ROB checks 1030 serves as one way to disable an external interrupt signal from being processed within the ROB. In a prior art system, the ROB EOM check circuitry 1030 disables interrupts throughout the microinstructions of each macroinstruction, as will be described with respect to FIG. 12.

The valid pointer of the next operation to be retired, valid_ptr(0) 1060, is provided to the MOB 503. This signal is coupled to a reset input of the flip-flop 1006.

In one embodiment, when a side-effect operation is at retirement and its valid pointer (valid_ptr(0)) is zero, this indicates that the operation is waiting to be retired. In this embodiment, interrupts are disabled by the assertion of the MO_DISABLE_INT signal 1010 provided from the MOB 503. Interrupts may also be disabled by the assertion of a signal from the ROB EOM check circuitry 1030 to the OR gate 1020. The ROB EOM check circuitry 1030 checks for exceptions, and other faults occurring during execution.

The present invention deasserts the MO_DISABLE_INT signal 1010 when the valid_ptr(0) is set, indicating that the current operation has completed. An external interrupt 1050 can then be allowed into the ROB via INTERRUPT signal 1055 and can be serviced as long as the ROB_EOM check circuitry does not continue to prevent INTERRUPT signal 1055 from being asserted.

FIG. 11 shows a timing diagram of the retirement process of operations in the ROB. In one embodiment, the retirement process is performed with a three stage pipeline.

In the first stage, the ROB 306 provides three pointers, which point to the three oldest operations in the machine. In the second stage, the ROB provides three valid bits. If a valid bit is set, this indicates that the associated operation is ready to retire (data has been returned to the ROB). In the third stage, the ROB provides three guaranteed bits. If a guaranteed bit is set, this indicates that the ROB is going to retire the associated operation. Up to all three entries in the ROB can be retired in a clock cycle.

An example will help illustrate. Table 1 shows a sequence of instructions which are to be retired. Each instruction gives rise to an operation to be performed. An arbitrary operation number is assigned to each operation to be performed. For example, operation 4 is an OUT operation. For one embodiment, both IN and OUT operations are performed at retirement, i.e., when all previous operations have already been executed and committed to the processor state. For another embodiment, all side-effect memory operations are also performed at retirement. Side-effect memory operations, for example, may arise from instructions that have particular opcode encodings or prefixes indicating that they are uncacheable, or certain register settings may indicate that the memory operation is uncacheable. For purposes of illustration, the OUT instruction of Table 1 is assumed to correspond to one microinstruction. An IN instruction and a side-effect memory instruction would behave similarly to the following description.

TABLE 1

| operation number | operation |
|---|---|
| 2 | x = a * b |
| 3 | y = c * d |
| 4 | z = OUT addr, data |
| 5 | x = a + b |
| 6 | y = a − b |

FIG. 11 shows the three-stages for the next three operations to retire in cycle__1 1100. Operations 2 and 3 will retire, but operation 4 will not retire. Operation 4 sits idle in the MOB since it waits until it is at retirement before it is dispatched from the MOB.

In cycle__2 1102, operation 4 is now at retirement. The MOB dispatches the OUT operation to the cache and bus controller in the next cycle, cycle__3 1104 and 1110. The ROB then waits for the OUT operation to complete. Interrupts are prevented from being serviced during this time by the assertion of the MO_DISABLE_INT signal 1010.

When the ROB receives the OUT data back, i.e., when the data is written back to the ROB at cycle_x 1120, the ROB retires the operation. The ROB's valid bit 1060 (FIG. 10) for the first pointer transitions from 0 to 1 to indicate that the operation is ready to be retired. The MOB monitors the valid bit 1060 of the first pointer. In response to the valid bit 1060 of the first pointer transitioning, the MOB 503 deasserts the MO_DISABLE_INT signal 1010. The guaranteed bit corresponding to the OUT instruction is also set to indicate that the ROB is actually retiring the OUT instruction.

FIGS. 12 and 13 show a sequence of macroinstructions. Each macroinstruction is comprised of one or more microinstructions, or uops, as shown. Each of the sequences of the one or more microinstructions has an end of macro (EOM) marker which indicates a separation between the macroinstructions. In the illustrative example, uop 2, uop 4, uop 5 and uop 9 each have an end of macro (EOM) marker associated with them.

FIG. 12 shows a sequences of macroinstructions in a prior art system. The atomicness of every macroinstruction is preserved in this prior art system. Interrupts are disabled during the microinstructions corresponding to each macroinstruction. Interrupts are serviced directly after any microinstruction that has an EOM marker, before the start of a microinstruction corresponding to another macroinstruction. The arrows indicate possible positions at which an interrupt can be serviced in the prior art system.

Thus, although an interrupt may be received during the execution of a particular macroinstruction, it is not serviced until the macroinstruction has been completely executed. For example, if an interrupt occurs while the processor is executing uop 1, then the processor will continue to process uop 1 as well as uop 2, before allowing the processor to handle the interrupt. Similarly, if an interrupt occurs while the processor is processing uop 6, then the processor will continue to process uop 6, as well as uop 7, uop 8 and uop 9, before servicing the interrupt.

FIG. 13 shows a sequences of macroinstructions utilizing the present invention. The atomicness of the side-effect macroinstructions is preserved. In other words, for side effect operations, interrupts are not allowed to be serviced once any of the microinstructions making of the side effect macroinstruction has started until the entire side-effect operation has finished. For example, FIG. 13 illustrates the blocking of interrupt servicing due to MACRO__2 being a side-effect operation. No interrupts can be serviced while the microinstructions making up MACRO__2 are being executed. However, for non-side-effect macroinstructions, such as MACRO__1, MACRO__3, AND MACRO__4, interrupts may be serviced during any of the microinstructions making up the non-side-effect macroinstructions.

Thus, an apparatus and method for disabling interrupts in a highly pipelined processor is disclosed. The specific arrangements and methods described herein are merely illustrative of the principles of this invention. Numerous modifications in form and detail may be made without departing from the scope of the described invention. Although this invention has been shown in relation to a particular embodiment, it should not be considered so limited. Rather, the described invention is limited only by the scope of the appended claims.

What is claimed is:

1. An out-of-order processor that executes macroinstructions, each macroinstruction comprising one or more microinstructions, the processor comprising:

a fetch and issue unit having an input for receiving the macroinstructions; and a reorder buffer coupled to the fetch and issue unit, the reorder buffer allowing an interrupt to be serviced during execution of the microinstructions making up any of a first class of the macroinstructions, the reorder buffer not allowing the interrupt to be serviced during execution of the microinstructions making up a second class of the macroinstructions.

2. The processor of claim 1 wherein the second class of the macroinstructions comprises an IN instruction.

3. The processor of claim 1 wherein the second class of the macroinstructions comprises an OUT instruction.

4. The processor of claim 1 wherein the second class of the macroinstructions comprises predetermined memory instructions.

5. The processor of claim 1 wherein the second class of the macroinstructions comprises a side-effect memory operation.

6. The processor of claim 1 wherein the second class of the macroinstructions comprises an uncacheable memory operation.

7. In a processor, a method of preventing an interrupt from being serviced while the processor is executing microinstructions that make up a macroinstruction, the method comprising the steps of:

(a) waiting until a first microinstruction of the macroinstruction is at retirement;

(b) signaling a reorder buffer by a memory subsystem of the processor to disable interrupts from being serviced;

(c) performing the microinstructions making up the macroinstruction; and (d) signaling the reorder buffer by the memory subsystem to allow interrupts to be serviced.

8. The method of claim 7 wherein the macroinstruction is an I/O operation.

9. The method of claim 7 wherein the macroinstruction is a predetermined memory operation.

10. The processor of claim 7 wherein the macroinstruction comprises a side-effect memory operation.

11. The processor of claim 7 wherein the macroinstruction comprises an uncacheable memory operation.

12. A processor that executes operations out-of-order, the processor comprising:

a reorder buffer for retiring operations in order, the reorder buffer providing a valid signal associated with a currently retiring operation; and a memory order buffer, the memory order buffer providing an input to the reorder buffer for disabling interrupts responsive to processing a next-to-retire operation that is within a predetermined group of operations.

13. The processor of claim 12 wherein the next-to-retire operation is an I/O operation.

14. The processor of claim 12 wherein the next-to-retire operation is a side-effect memory operation.

15. The processor of claim 12 wherein the next-to-retire operation is an uncacheable memory operation.

16. The processor of claim 12 wherein the next-to-retire operation is a memory operation mapped to an I/O device.

* * * * *